(12) United States Patent
Tochihara et al.

(10) Patent No.: US 10,696,789 B2
(45) Date of Patent: Jun. 30, 2020

(54) METHOD FOR PRODUCING POLYAMIDE RESIN

(71) Applicant: Mitsubishi Gas Chemical Company, Inc., Tokyo (JP)

(72) Inventors: Tatsuya Tochihara, Niigata (JP); Katsumi Shinohara, Niigata (JP); Jun Mitadera, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 15/517,464

(22) PCT Filed: Sep. 8, 2015

(86) PCT No.: PCT/JP2015/075502
§ 371 (c)(1),
(2) Date: Apr. 6, 2017

(87) PCT Pub. No.: WO2016/056340
PCT Pub. Date: Apr. 14, 2016

(65) Prior Publication Data
US 2017/0306091 A1  Oct. 26, 2017

(30) Foreign Application Priority Data
Oct. 7, 2014  (JP) .................................. 2014-206591

(51) Int. Cl.
*C08G 69/28* (2006.01)
*C08L 77/06* (2006.01)
*C08G 69/26* (2006.01)

(52) U.S. Cl.
CPC .............. *C08G 69/28* (2013.01); *C08G 69/26* (2013.01); *C08L 77/06* (2013.01)

(58) Field of Classification Search
CPC .......... C08L 77/06; C08G 69/36; C08G 69/26
See application file for complete search history.

(56) References Cited

U.S. PATENT DOCUMENTS

| | | |
|---|---|---|
| 2012/0065327 A1 | 3/2012 | Ogawa et al. |
| 2012/0172512 A1* | 7/2012 | Ishii .................... C08L 25/18 524/405 |
| 2015/0073120 A1 | 3/2015 | Tochihara et al. |
| 2015/0291736 A1 | 10/2015 | Muneyasu et al. |

FOREIGN PATENT DOCUMENTS

| | | |
|---|---|---|
| CN | 101525287 A | 9/2009 |
| JP | 53-082717 A | 7/1978 |
| JP | 57-134441 A | 8/1982 |
| JP | 2009-204121 A | 9/2009 |
| JP | 2010-253803 A | 11/2010 |
| JP | 2013-87369 A | 5/2013 |
| JP | 2014-037468 A | 2/2014 |
| WO | WO 01/21572 * | 3/2001 |
| WO | 2010/137703 A1 | 12/2010 |
| WO | 2013/129341 A1 | 9/2013 |
| WO | 2014/073373 A1 | 5/2014 |

OTHER PUBLICATIONS

Neuchem Safety Data Sheet , revision Jan. 23, 2014, Jan. 2014.*
Karunanithi et al Solvent design for crystallization of carboxylic acids, Computers and Chemical Engineering 33 (2009) 1014-1021, Sep. 2009.*
http://www.itoh-oilchem.co.jp/english/pdct01.html., Jan. 2011.*
http://www.castoroil.in/castor/castor_seed/castor_oil/sebacic_acid/sebacic_acid.html , Sep. 2009.*
International Search Report dated Dec. 15, 2015, for PCT/JP2015/075502 and English translation of the same (5 pages).

* cited by examiner

*Primary Examiner* — Gregory Listvoyb
(74) *Attorney, Agent, or Firm* — Fitch, Even, Tabin & Flannery LLP

(57) ABSTRACT

Provided is a method for producing a polyamide resin including reacting a dicarboxylic acid component containing sebacic acid in an amount of 50 mol % or more and a diamine component containing xylylenediamine in an amount of 70 mol % or more, wherein the total content of the specific compounds in the sebacic acid is 100 ppm by mass or less.

6 Claims, No Drawings

METHOD FOR PRODUCING POLYAMIDE RESIN

CROSS-REFERENCE TO RELATED APPLICATIONS

This application is a U.S. national phase application filed under 35 U.S.C. § 371 of International Application PCT/JP2015/075502, filed on Sep. 8, 2015, designating the United States, which claims priority from Japanese Application Number 2014-206591, filed Oct. 7, 2014, which are hereby incorporated herein by reference in their entirety.

FIELD OF THE INVENTION

The present invention relates to a method for producing a polyamide resin, and specifically to a method for producing a polyamide resin using sebacic acid as a dicarboxylic acid component.

BACKGROUND OF THE INVENTION

Polyamide resins as typified by nylon 6, nylon 66 and the like are widely utilized for fibers for clothing, engineering plastics and others, because of their excellent characteristics of toughness, chemical resistance, electric characteristics and others and their easiness in melt molding.

ϑ-caprolactam that is a starting material for nylon 6 and adipic acid and hexamethylenediamine that are starting materials for nylon 66 are fossil resources-derived materials, but because of consideration of the global environment in recent years, it has become desired to use plant-derived materials as starting materials for polyamide resins.

Under the situation, sebacic acid, which is a plant-derived material obtainable from castor oil, has been noted and a polyamide resin produced using sebacic acid as a dicarboxylic acid component has been proposed (see PTLs 1 and 2). The polyamide resin obtained by using sebacic acid has characteristics of low water absorbability and excellent dimensional stability, and its application to electric/electronic parts and the like is expected.

CITATION LIST

Patent Literature

PTL 1: JP-A 2013-87369
PTL 2: JP-A 2010-253803

SUMMARY OF INVENTION

However, when a polyamide resin is produced using sebacic acid as a dicarboxylic acid component, the resultant polyamide resin may be often colored (yellowish coloration).

A technical problem that the present invention is to solve is to provide a method for producing a polyamide resin capable of obtaining a less colored polyamide resin while using sebacic acid as a dicarboxylic acid component.

As a result of assiduous studies, the present inventors have found that the starting material sebacic acid is contributory to coloration of polyamide resin. Since sebacic acid is a plant-derived material, strictly speaking, minor impurities are contained in sebacic acid, and the present inventors have found that the coloration of polyamide resin is caused by some specific compounds contained in such minor impurities. Accordingly, the inventors have found that by using a specific sebacic acid, the coloration of polyamide resin can be reduced, and have completed the present invention.

Specifically, the present invention relates to a method for producing a polyamide resin to be described below.

<1>
A method for producing a polyamide resin, including:
reacting a dicarboxylic acid component containing sebacic acid in an amount of 50 mol % or more and a diamine component containing xylylenediamine in an amount of 70 mol % or more,
wherein a total content of compounds represented by the following general formula (A) and the following general formula (B) in the sebacic acid is 100 ppm by mass or less:

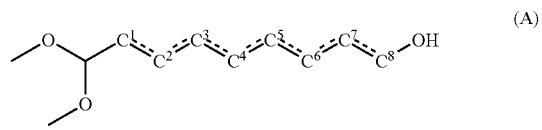

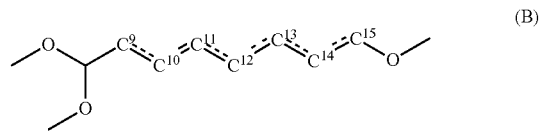

wherein, in the general formula (A), one hydroxyl group is bonded to one of carbon atoms $C^1$, $C^2$, $C^3$, $C^4$, $C^5$, $C^6$, $C^7$ and $C^8$, and
one of a bond between $C^1$ and $C^2$, a bond between $C^2$ and $C^3$, a bond between $C^3$ and $C^4$, a bond between $C^4$ and $C^5$, a bond between $C^5$ and $C^6$, a bond between $C^6$ and $C^7$, and a bond between $C^7$ and $C^8$ is a double bond, and the others are single bonds; and
in the general formula (B), one hydroxyl group is bonded to one of carbon atoms $C^9$, $C^{10}$, $C^{11}$, $C^{12}$, $C^{13}$, $C^{14}$ and $C^{15}$, and
one of a bond between $C^9$ and $C^{10}$, a bond between $C^{10}$ and $C^{11}$, a bond between $C^{11}$ and $C^{12}$, a bond between $C^{12}$ and $C^{13}$, a bond between $C^{13}$ and $C^{14}$, and a bond between $C^{14}$ and $C^{15}$ is a double bond, and the others are single bonds.
<2>
The method for producing a polyamide resin described in <1>, wherein the sebacic acid has a purity of 99.5% by mass or more.
<3>
The method for producing a polyamide resin described in <1> or <2>, wherein the xylylenediamine is metaxylylenediamine, paraxylylenediamine or a mixture thereof.
<4>
The method for producing a polyamide resin described in any of <1> to <3>, wherein the dicarboxylic acid component and the diamine component are reacted in the presence of a phosphorus atom-containing compound.
<5>
The method for producing a polyamide resin described in <4>, wherein the phosphorus atom-containing compound is selected from the group consisting of sodium hypophosphite, calcium hypophosphite and hydrates of these compounds.
<6>
The method for producing a polyamide resin described in any of <1> to <5>, wherein the sebacic acid is obtained according to a recrystallization method using methanol as a solvent.

According to the present invention, by using a specific sebacic acid as a dicarboxylic acid component to produce a polyamide resin, the coloration of the polyamide resin to be obtained can be reduced.

DESCRIPTION OF EMBODIMENTS

The method for producing a polyamide resin of the present invention is a method for producing a polyamide resin that includes reacting a dicarboxylic acid component containing sebacic acid in an amount of 50 mol % or more and a diamine component containing xylylenediamine in an amount of 70 mol % or more, wherein a specific sebacic acid to be mentioned below is used as the sebacic acid.

(Dicarboxylic Acid Component)

The dicarboxylic acid component to be used in the present invention contains sebacic acid in an amount of 50 mol % or more. The upper limit of the content of the sebacic acid in the dicarboxylic acid component is not specifically limited, and the content of the sebacic acid is 100 mol % or less. From the viewpoint of producing a polyamide resin having low water absorbability and excellent in dimensional stability, the content of sebacic acid in the dicarboxylic acid component is preferably 70 mol % or more, more preferably 90 mol % or more, even more preferably 95 mol % or more, especially preferably 100 mol %. In the present invention, a specific sebacic acid to be mentioned below is used as the sebacic acid to reduce coloration of polyamide resin.

(Specific Sebacic Acid)

Sebacic acid is a compound represented by $HOOC(CH_2)_8COOH$, but sebacic acid that is actually available as a commercial product contains, as minor impurities mixed therein, any other compounds than $HOOC(CH_2)_8COOH$ because it is a plant-derived material. Specifically, it can be said that sebacic acid that is actually available as a commercial product is, strictly speaking, not a compound $HOOC(CH_2)_8COOH$ 100% but a mixture containing the compound $HOOC(CH_2)_8COOH$ and any other compounds (impurities).

The present inventors have found that, among various compounds contained as purities in sebacic acid, especially compounds represented by the following general formula (A) and compounds represented by the following general formula (B) have some influences on coloration of polyamide resin.

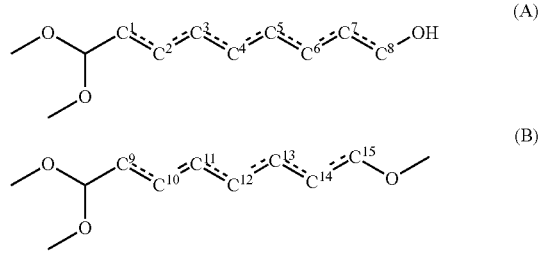

In the general formula (A), one hydroxyl group is bonded to one of carbon atoms $C^1$, $C^2$, $C^3$, $C^4$, $C^5$, $C^6$, $C^7$ and $C^8$, and
one of a bond between $C^1$ and $C^2$, a bond between $C^2$ and $C^3$, a bond between $C^3$ and $C^4$, a bond between $C^4$ and $C^5$, a bond between $C^5$ and $C^6$, a bond between $C^6$ and $C^7$, and a bond between $C^7$ and $C^8$ is a double bond, and the others are single bonds.

In the general formula (B), one hydroxyl group is bonded to one of carbon atoms $C^9$, $C^{10}$, $C^{11}$, $C^{12}$, $C^{13}$, $C^{14}$ and $C^{15}$, and
one of a bond between $C^9$ and $C^{10}$, a bond between $C^{10}$ and $C^{11}$, a bond between $C^{11}$ and $C^{12}$, a bond between $C^{12}$ and $C^{13}$, a bond between $C^{13}$ and $C^{14}$, and a bond between $C^{14}$ and $C^{15}$ is a double bond, and the others are single bonds.

Using sebacic acid in which the content of the compounds represented by the general formula (A) and the compounds represented by the general formula (B) is small in producing a polyamide resin makes it possible to reduce coloration of the polyamide resin. Specifically, using sebacic acid in which the total content of the compounds represented by the general formula (A) and the general formula (B) is 100 ppm by mass or less makes it possible to prevent coloration of polyamide resin. The total content of the compounds represented by the general formula (A) and the general formula (B) in sebacic acid is preferably 80 ppm by mass or less, more preferably 50 ppm by mass or less, even more preferably 30 ppm by mass or less. The lower limit of the total content of the compounds represented by the general formula (A) and the general formula (B) in sebacic acid is not specifically limited, and the total content is 0 ppm by mass or more.

The purity of the sebacic acid to be used in the present invention is preferably 99.5% by mass or more, more preferably 99.7% by mass or more. The upper limit of the purity of the sebacic acid is not specifically limited, and the purity of the sebacic acid is 100% by mass or less.

The total content of the compounds represented by the general formula (A) and the general formula (B) in sebacic acid may be quantified through GC to be mentioned below.

<Sample Preparation Method (Methyl Esterification of Sebacic Acid)>

(1) 0.45 g of sebacic acid is dissolved in 1.2 g of methanol with heating.

(2) 0.27 g of 35% HCl is added to the solution obtained in the above (1), and heated at 60° C. for about 1 hour.

(3) 4.5 g of water is added to the liquid obtained in the above (2), and well stirred.

(4) 1.2 g of hexane is added to the liquid obtained in the above (3), and well stirred.

(5) The oily phase of the liquid obtained in the above (4) is collected, and an internal standard substance (diphenylmethane) is added thereto in an amount of 1% of the sample liquid to prepare a sample.

<Details of GC>

Apparatus: GC2014 by Shimadzu Corporation
Column: capillary DB-1, 30 m×0.25 mm, liquid-phase membrane thickness: 0.25 μm
Column temperature profile: 100° C.→(5° C./min)→300° C. (kept for 10 min)
Injection temperature: 300° C.
Detector temperature: 300° C.
Carrier gas: He
Split ratio 1/5
Sample amount: 1 μL In production of a polyamide resin in the present invention, it is important to use the above-mentioned specific sebacic acid. Accordingly, it is impossible to indiscriminately select and use a starting material sebacic acid, and it is necessary to select and use the above-mentioned specific sebacic acid. For example, through GC mentioned above, the total content of the compounds represented by the general formula (A) and the general formula (B) in sebacic acid is quantified and the above-mentioned specific sebacic acid can be thereby selected.

The above-mentioned specific sebacic acid may also be obtained through purification. For example, as the purification method, a recrystallization method using methanol as a solvent can be mentioned, but the purification method is not limited thereto. A concrete operation in the recrystallization method using methanol as a solvent is, for example, as mentioned below.

<Recrystallization Method Using Methanol as Solvent>

Sebacic acid is added to methanol and dissolved therein at about 50° C. to saturation, and then gently cooled down to room temperature. The resultant slurry is filtered, and the crystallized sebacic acid alone is collected and dried at about 80° C. to remove methanol, thereby removing impurities.

(Other Dicarboxylic Acid Component than Sebacic Acid)

The dicarboxylic acid component to be used in the present invention may contain any other dicarboxylic acid than sebacic acid, depending on the mechanical properties, molding workability, heat resistance and others of the polyamide resin to be obtained. Examples of such dicarboxylic acids include, though not limited thereto, other linear aliphatic dicarboxylic acids than sebacic acid, branched aliphatic dicarboxylic acids, alicyclic dicarboxylic acids, aromatic dicarboxylic acids, and mixtures thereof.

Other linear aliphatic dicarboxylic acids than sebacic acid include oxalic acid, malonic acid, succinic acid, glutaric acid, adipic acid, pimellic acid, suberic acid, azelaic acid, undecanoic diacid, dodecanoic diacid, tridecanoic diacid, tetradecanoic diacid, pentadecanoic diacid, hexadecanoic diacid, etc. Above all, linear aliphatic dicarboxylic acids having 6 to 18 carbon atoms are preferred; at least one selected from the group consisting of adipic acid, azelaic acid, undecanoic diacid and dodecanoic diacid is more preferred; and adipic acid is especially preferred.

Specific examples of branched aliphatic di carboxylic acids include 3,3-diehtylsuccinic acid, 2-methyladipic acid, 2,2-dimethylglutaric acid, 2,4-dimethylglutaric acid, 3,3-dimethylglutaric acid, trimethyladipic acid, etc.

Specific examples of alicyclic dicarboxylic acids include 1,3-cyclopentanedicarboxylic acid, 1,3-cyclohexanedicarboxylic acid, 1,4-cyclohexanedicarboxylic acid, etc.

Specific examples of aromatic dicarboxylic acids include isophthalic acid, terephthalic acid, 2,6-naphthalenedicarboxylic acid, 1,5-naphthaleneicarboxylic acid, 1,4-naphthalenedicarboxylic acid, 2,7-naphthalenedicarboyxlic acid, etc.

(Diamine Component)

The diamine component for use in the present invention contains xylylenediamine in an amount of 70 mol % or more. The upper limit of the content of xylylenediamine in the diamine component is not specifically limited, and the content of xylylenediamine is 100 mol % or less. In the present invention, the specific sebacic acid is used to reduce coloration of polyamide resin, and this coloration-reducing effect is not exhibited by combination with an arbitrary diamine component but is exhibited by combination with a diamine component containing xylylenediamine. In the present invention, the content of xylylenediamine in the diamine component is 70 mol % or more, preferably 80 mol % or more, more preferably 90 mol % or more, even more preferably 95 mol % or more, especially preferably 100 mol %.

Xylylenediamine is preferably metaxylylenediamine, paraxylylenediamine or a mixture thereof. From the viewpoint of the gas-barrier performance of the polyamide resin to be obtained, metaxylylenediamine is preferred, and from the viewpoint of the heat resistance and dimensional stability of the polyamide resin to be obtained, paraxylylenediamine is preferred.

The purity of the xylylenediamine to be used in the present invention is preferably 99.5% by mass or more, more preferably 99.7% by mass or more, even more preferably 99.9% by mass or more. The upper limit of the purity of the xylylenediamine is not specifically limited, and the purity of the xylylenediamine is 100% by mass or less.

(Other Diamine Component than Xylylenediamine)

The diamine component for use in the present invention may contain any other diamine than xylylenediamine, depending on the mechanical properties, molding workability, heat resistance and others of the polyamide resin to be obtained. Examples of such diamines include, though not limited thereto, aliphatic diamines, alicyclic diamines, aromatic diamines and mixtures thereof.

Specific examples of aliphatic diamines include 1,4-butanediamne, 1,6-hexanediamine, 1,8-octanediamine, 1,10-decanediamine, 1,12-dodecanediamine, 2-methyl-1,5-pentanediamine, 2,2,4-trimethyl-1,6-hexanediamine, 2,4,4-trimethyl-1,6-hexanediamine, 2-methyl-1,8-octanediamine, 5-methyl-1,9-nonanediamine, etc.

Specific examples of alicyclic diamines include bis(aminomethyl)cyclohexane, cyclohexanediamine, methylcyclohexanediamine, isophoronediamine, etc. Examples of bis (aminomethyl)cyclohexane include 1,3-bis(aminomethyl) cyclohexane, and 1,4-bis(aminomethyl)cyclohexane.

(Method for Producing Polyamide Resin)

The method for producing a polyamide resin of the present invention includes reacting a dicarboxylic acid component containing the above-mentioned specific sebacic acid in an amount of 50 mol % or more and a diamine component containing xylylenediamine in an amount of 70 mol % or more. This reaction is polycondensation, and produces a polymer through chain-like connection of a dicarboxylic acid component and a diamine component along with release of water molecules. A small amount of a monoamine or a monocarboxylic acid serving as a molecular weight regulator may be added during poly condensation.

Examples of the polycondensation method for a polyamide resin include a pressurized salt method, a normal-pressure instillation method, a pressurized instillation method, and a reactive extrusion method, but are not limited thereto.

<Pressurized Salt Method>

The pressurized salt method is a method of melt polycondensation under pressure, starting from a nylon salt as the starting material. Specifically, an aqueous solution of a nylon salt containing a diamine component and a dicarboxylic acid component is prepared, and the aqueous solution is heated and the pressure thereof is increased through vaporization of water in the aqueous solution, and is subjected to polycondensation with removing the condensation water so as to keep the pressure at or above a predetermined level. Subsequently, while the pressure in the reactor is gradually restored to normal pressure, the system is heated up to around a temperature of (melting temperature+10° C.) of the polyamide resin and kept as such, and thereafter the inner pressure is gradually reduced to 80 kPa (Abs) and kept as such at the temperature to continue the polycondensation. After the system has reached a predetermined stirring torque, the reactor is pressurized with nitrogen and the polyamide resin is then collected.

<Normal-Pressure Instillation Method>

The normal-pressure instillation method is a method where a diamine component is continuously added dropwise to a heated and melted dicarboxylic acid component, and subjected to polycondensation while removing condensed water. During the polycondensation reaction, the reaction system is heated in order that the reaction temperature is not lower than the melting temperature of the polyamide resin to be produced. After dropwise addition of the diamine, the system is heated up to a temperature not lower than (melting temperature+10° C.) of the polyamide resin, kept as such, and gradually depressurized to further continue the polycondensation.

In the normal-pressure instillation method, the yield per batch is large as compared with that in the above-mentioned pressurized salt method, since the method does not require water for salt dissolution, and in addition, since the method does not require vaporization and condensation of the starting material components, the reaction speed lowers little and the process time can be shortened.

<Pressurized Instillation Method>

In the pressurized instillation method, first a dicarboxylic acid component is charged into a polycondensation reactor, and then the component is melted and mixed. Next, while the reactor is pressurized preferably up to 0.4 to 0.5 MPa (Abs) or so, a diamine component is continuously added dropwise to the heated and melted dicarboxylic acid and subjected to polycondensation while condensed water is removed. During this, the reaction system is heated in order that the reaction temperature is not lower than the melting temperature of the polyamide resin to be produced. After the components have reached a predetermined molar ratio, the dropwise addition of the diamine component is finished. While the reactor is gradually restored to normal pressure, the system therein is heated up to around a temperature of (melting temperature+10° C.) of the polyamide resin, and kept as such. Subsequently, while the reactor is gradually depressurized, the polycondensation is further continued. After the system has reached a predetermined stirring torque, the reactor is pressurized with nitrogen up to 0.4 MPa (Abs) or so and the polyamide resin is then collected.

The pressurized instillation method is useful in the case where a volatile component is used as the monomer. Different from the pressurized salt method, the pressurized instillation method does not require water for salt dissolution and therefore the yield per batch according to the method is large. In addition, in the method, the reaction time can be shortened and therefore the system can be prevented from gelling, like in the normal-pressure instillation method. Accordingly, the method produces a polyamide resin having a low yellow index.

<Reactive Extrusion Method>

The reactive extrusion method is a method of reacting a polyamide oligomer containing a diamine component and a dicarboxylic acid component by melt-kneading it in an extruder. For sufficient reaction, preferably, a screw suitable for reactive extrusion is used, and a twin-screw extruder having a large L/D is used.

From the viewpoint of production cost, the normal-pressure instillation method or the pressurized instillation method is preferred. Specifically, the method of continuously adding a diamine component to a molten dicarboxylic acid component for polycondensation under normal pressure or increased pressure is preferred.

In transferring a molten dicarboxylic acid into a reactor, the method preferably includes a step of filtering the molten dicarboxylic acid component. Filtering a molten dicarboxylic acid component to remove insoluble matters makes it possible to reduce fish eyes in the resultant polyamide resin. The filtering means is not specifically limited, and a filter such as a sintered metal filter, a glass fiber filter or the like can be used.

<Step of Increasing Degree of Polymerization>

The polyamide resin produced according to the above-mentioned polycondensation method can be used as it is, however, the resin may be processed in a step of further increasing the degree of polymerization thereof. The step of increasing the degree of polymerization includes reactive extrusion in an extruder, solid-phase polymerization, etc. As the heating apparatus for use for solid-phase polymerization, a continuous heating and drying apparatus, a rotary drum-type heating apparatus such as a tumble drier, a conical drier, a rotary drier or the like, and a conical heating apparatus equipped with a rotary blade inside it, such as a Nauta mixer or the like, are preferred. Not limited to these, any ordinary method and apparatus are usable in the present invention. In particular, for solid-phase polymerization to give the polyamide resin, use of a rotary drum-type heating apparatus among the above is preferred, since the system can be airtightly sealed up and the polycondensation can be readily promoted therein in a condition where oxygen, which causes coloration, is eliminated.

(Phosphorus Atom-Containing Compound, Alkali Metal Compound)

In polycondensation to produce polyamide resin, it is preferred to add a phosphorus atom-containing compound to the polycondensation system for polyamide resin from the viewpoint of promoting amidation. The phosphorus atom-containing compound added can serve as a catalyst for polycondensation and can prevent coloration of polyamide resin, which is caused by oxygen existing in the polycondensation system.

As the phosphorus-containing compound, use of at least one selected from the group consisting of alkali metal hypophosphites, alkaline earth metal hypophosphites, alkali metal phosphites, alkaline earth phosphites, alkali metal phosphates, alkaline earth metal phosphates, alkali metal pyrophosphates, alkaline earth metal pyrophosphates, alkali metal metaphosphates, and alkaline earth metal metaphosphates is preferred. The phosphorus atom-containing compound usable in the present invention is not limited to these compounds.

Specific examples of the phosphorus atom-containing compound include sodium hypophosphite, potassium hypophosphite, lithium hypophosphite, calcium hypophosphite, magnesium hypophosphite, sodium phosphite, sodium hydrogenphosphite, potassium phosphite, potassium hydrogenphosphite, lithium phosphite, lithium hydrogenphosphite, magnesium phosphite, magnesium hydrogenphosphite, calcium phosphite, calcium hydrogenphosphite, sodium phosphate, disodium hydrogenphosphate, sodium dihydrogenphosphate, potassium phosphate, dipotassium hydrogenphosphate, potassium dihydrogenphosphate, magnesium phosphate, dimagnesium hydrogenphosphate, magnesium dihydrogenphosphate, calcium phosphate, dicalcium hydrogenphosphate, calcium dihydrogenphosphate, lithium phosphate, dilithium hydrogenphosphate, lithium dihydrogenphosphate, sodium pyrophosphate, potassium pyrophosphate, magnesium pyrophosphate, calcium pyrophosphate, lithium pyrophosphate, sodium metaphosphate, potassium metaphosphate, magnesium metaphosphate, calcium metaphosphate, lithium metaphosphate, and mixtures thereof. Among these, sodium hypophosphite, potassium hypophosphite, calcium hypophosphite, magnesium hypophosphite, calcium phosphite, calcium hydrogenphosphite, and calcium dihydrogenphosphate are preferred; and sodium hypophosphite and calcium hypophosphite are more preferred. These phosphorus atom-containing compounds may be hydrates.

The amount of the phosphorus atom-containing compound to be added is preferably 0.1 to 1,000 ppm by mass in terms of the phosphorus atom concentration in the polyamide resin, more preferably 1 to 600 ppm by mass, even more preferably 5 to 400 ppm by mass. When the content is 0.1 ppm by mass or more, the polyamide resin is less likely to be colored during polymerization and can have high transparency. When the content is 1,000 ppm by mass or less, the polyamide resin hardly gels, and fish eyes that are considered to be caused by a phosphorus atom-containing compound can be prevented from forming in molded articles and therefore the molded articles can have good appearance.

Furthermore, an alkali metal compound, along with the phosphorus atom-containing compound, is preferably added to the polycondensation system to prepare the polyamide resin. A sufficient amount of a phosphorus atom-containing compound may be required to be present in the system in order to prevent the coloration of the polyamide resin during polycondensation, which, however, may rather cause gelation of the polyamide resin as the case may be. Therefore, for avoiding the problem and additionally for controlling the amidation reaction speed, it is preferable to add an alkali metal compound to the system, along with the phosphorus atom-containing compound thereto.

The alkali metal compound is preferably an alkali metal hydroxide, an alkali metal acetate, an alkali metal carbonate, an alkali metal alkoxide, etc. Specific examples of the alkali metal compound usable in the present invention include lithium hydroxide, sodium hydroxide, potassium hydroxide, rubidium hydroxide, cesium hydroxide, lithium acetate, sodium acetate, potassium acetate, rubidium acetate, cesium acetate, sodium methoxide, sodium ethoxide, sodium propoxide, sodium butoxide, potassium methoxide, lithium methoxide, sodium carbonate, etc., to which, however, the usable compound is not limited. The ratio of the phosphorus atom-containing compound to the alkali metal compound, phosphorus atom-containing compound/alkali metal compound is preferably within a range of 1.0/0.05 to 1.0/1.5, from the viewpoint of controlling the polymerization speed and reducing the yellow index, more preferably 1.0/0.1 to 1.0/1.2, even more preferably 1.0/0.2 to 1.0/1.1.

(Polyamide Resin)

The polyamide resin to be produced according to the production method of the present invention is described below.

As described above, the yellow index of the polyamide resin can be suppressed to low levels by using the specific sebacic acid, and is preferably 5 or less, more preferably 4 or less, even more preferably 3 or less.

With respect to the terminal group balance in the polyamide resin, that is, the balance between the terminal carboxyl group concentration [COOH] and the terminal amino group concentration [NH$_2$], it is preferable that the terminal carboxyl group concentration is higher than the terminal amino group concentration. The difference between the terminal carboxyl group concentration [COOH] and the terminal amino group concentration [NH$_2$] ([COOH]—[NH$_2$]) is preferably 10 to 80 μeq/g, more preferably 20 to 70 μeq/g, even more preferably 25 to 60 μeq/g.

The relative viscosity of the polyamide resin is preferably 1.8 to 4.0, more preferably 2.0 to 3.5. When the relative viscosity is 1.8 or more, the polyamide resin can be utilized without causing a problem in moldability which may be caused by insufficient melt viscosity in molding. On the other hand, when the relative viscosity is 4.0 or less, the polyamide resin can be utilized without causing a problem in moldability which may be caused by too high melt viscosity in molding.

The melting temperature of the polyamide resin is preferably 150 to 320° C., more preferably 180 to 300° C. Falling within the range, the polyamide resin is easy to melt in an extruder, and the productivity and the molding workability are thereby bettered.

The polyamide resin obtained in the production method of the present invention and the resin composition containing the resin can be formed into molded articles having a desired shape, according to a known molding method such as injection molding, blow molding, extrusion molding, compression molding, stretching, vacuum molding or the like. The resin and the resin composition can be molded not only as molded articles of engineering plastics but also as films, sheets, hollow containers, fibers, tubes and other forms of molded articles, and can be favorably used for industrial materials, engineering materials, domestic articles or the like.

The molded articles containing the polyamide resin obtained in the production method of the present invention and the resin composition containing the resin can be favorably used in various applications such as electric/electronic parts, slide members, blow moldings, automobile parts and the like.

Specific examples of electric/electronic parts include connectors, switches, IC and LED housings, sockets, relays, resistors, condensers, capacitors, coil bobbins and other electric/electronic parts to be mounted on printed boards.

Specific examples of slide members include bearings, gears, bushes, spacers, rollers, cams and other various slide members.

Specific examples of automobile parts include engine mounts, engine covers, torque control levers, window regulators, front lamp reflectors, door mirror stays, etc.

EXAMPLES

The present invention is described in more detail with reference to Examples, but the present invention should not be limited to these Examples.

In Examples and Comparative Examples, the samples were analyzed and measured according to the following methods.

(1) Yellow Index (YI)

The yellow index was measured in a reflection method in accordance with JIS-K-7373 using a color difference meter, ZE-2000 manufactured by Nippon Denshoku Industries Co., Ltd.

(2) Terminal Amino Group Concentration ([NH$_2$]) in Polyamide 0.3 to 0.5 g of polyamide was accurately weighed, and dissolved in 30 ml of a solution of phenol/ethanol=4/1 (by volume) at 20 to 30° C. with stirring. After completely dissolved, the solution was subjected to neutralization titration with an aqueous solution of N/100 hydrochloric acid with stirring, thereby determining the terminal amino group concentration of the polyamide.

(3) Terminal Carboxyl Group Concentration ([COOH]) in Polyamide 0.3 to 0.5 g of polyamide was accurately weighed, and dissolved in 30 ml of benzyl alcohol in a nitrogen current atmosphere at 160 to 180° C. with stirring. After completely dissolved, the solution was cooled to 80° C. or lower in the nitrogen current atmosphere, 5 ml of methanol was added thereto with stirring, and the solution was subjected to neutralization titration with an aqueous solution of N/100 sodium hydroxide, thereby determining the terminal carboxyl group concentration of the polyamide.

(4) Relative Viscosity 0.2 g of polyamide resin was accurately weighed, and dissolved in 20 ml of 96% sulfuric acid at 20 to 30° C. with stirring. After completely dissolved, 5 ml of the solution was rapidly taken into a Cannon-Fenske viscometer, left in a thermostat at 25° C. for 10 minutes, and the dropping time (t) thereof was measured. In addition, the dropping time (to) of 96% sulfuric acid was also measured in the same manner. From t and to, the relative viscosity of the polyamide resin was calculated according to the following formula.

$$\text{Relative Viscosity} = t/t_0$$

(5) Melting Temperature (Tm)

Using a differential scanning calorimeter [trade name: DSC-60, manufactured by Shimadzu Corporation], the melting temperature (Tm) of polyamide resin was measured through DSC (differentia scanning calorimetry) in a nitrogen current atmosphere at a heating rate of 10° C./min.

(Sebacic Acid)

The following sebacic acids were used in Examples and Comparative Examples.

Sebacic acid (a): sebacic acid manufactured by Itoh Oil Chemicals Co., Ltd. (purity 99.75% by mass)

Sebacic acid (b): sebacic acid manufactured by Itoh Oil Chemicals Co., Ltd. (purity 99.74% by mass)

Sebacic acid (c): sebacic acid manufactured by Itoh Oil Chemicals Co., Ltd. (purity 99.74% by mass)

Sebacic acid (d): sebacic acid prepared from sebacic acid (c) by a recrystallization method using methanol as a solvent. Concrete operation is as follows.

<Recrystallization Method Using Methanol as Solvent>

Sebacic acid manufactured by Itoh Oil Chemicals Co., Ltd. (purity 99.74% by mass) was put into methanol, and dissolved therein at about 50° C. to saturation, and then gently cooled to room temperature. The resultant slurry was filtered, and the crystallized sebacic acid alone was collected and dried at about 80° C. to remove methanol, thereby preparing purified sebacic acid.

(Evaluation of Sebacic Acid)

Impurities contained in the sebacic acids (a) to (d) were identified according to the following method.

<Sample Preparation (Methyl Esterification of Sebacic Acid)>

(1) 0.45 g of sebacic acid was dissolved in 1.2 g of methanol with heating.

(2) 0.27 g of 35% HCl was added to the solution obtained in the above (1), and heated at 60° C. for about 1 hour.

(3) 4.5 g of water was added to the liquid obtained in the above (2), and well stirred.

(4) 1.2 g of hexane was added to the liquid obtained in the above (3), and well stirred.

(5) The oily phase of the liquid obtained in the above (4) was collected, and an internal standard substance (diphenylmethane) was added to the sample liquid in an amount of 1% to prepare a sample.

<GC-TOF-MS Measurement>

The sample was subjected to GC-TOF-MS measurement under the condition mentioned below.
Apparatus: JEOL ACCU-TOF-GVC (JMS-T100GCV)
Thousandth mass EI-pos
  Resolution: 5,000
  Mass range: M/Z 10 to 800
  Spectrum recording distance: 0.4 sec
  Ionization voltage: 70 eV
  Ionization current: 300 µA
  Detector voltage: 2,200 V
  Standard substance: perfluorokerosene (high boiling)
Thousandth mass CI-pos
  Resolution: 5,000
  Mass range: M/Z 60 to 800
  Spectrum recording distance: 0.4 sec
  Ionization voltage: 200 eV
  Ionization current: 300 µA
  Reaction gas: i-butane
  Detector voltage: 2,200 V
  Standard substance: 2,4,6-tris(trifluoromethyl)-1,3,5-triazine
Details of GC-TOF-MS
  Apparatus: Agilent 7890A
  Column: capillary DB-1 30 m×0.25 mm, liquid phase membrane thickness: 0.25 µm.
  Column temperature profile: 100° C.→(5° C./min)→300° C. (kept for 10 min)
  Injection temperature: 300° C.
  Carrier gas: He
  Split ratio 1/5
  Sample amount: 1 µL As a result of the above-mentioned measurement, the component detected in the retention time 12.55 minutes was identified to be the compound represented by the general formula (A) or (B).

Next, the above sample was subjected to CG under the condition mentioned below, which confirmed that the total content of the compounds represented by the general formulae (A) and (B) in the sebacic acid (a) is 21 ppm by mass.
<Details of GC>
  Apparatus: GC2014 by Shimadzu Corporation
  Column: capillary DB-1, 30 m×0.25 mm, liquid-phase membrane thickness: 0.25 µm
  Column temperature profile: 100° C.→(5° C./min)→300° C. (kept for 10 min)
  Injection temperature: 300° C.
  Detector temperature: 300° C.
  Carrier gas: He
  Split ratio 1/5
  Sample amount: 1 µL Also through CG the total amount of the compounds represented by the general formulae (A) and (B) in the sebacic acid (b), (c) and (d) was confirmed to be 72, 154 and 35 ppm by mass, respectively.

Example 1

Using a 500-liter stainless batch reactor equipped with a temperature-controlled oil-running partial condenser, a total condenser, a nitrogen gas introducing duct, a jacket with oil running therethrough to cover around the entire surface of the reactor, a diamine dropping tank, and a pump, a polyamide was synthesized in the manner mentioned below.

150.0 kg (739.8 mol) of sebacic acid (a) and, as a stabilizer, 115 g of sodium hypophosphite were put into the reactor, fully purged with nitrogen, and then the sebacic acid was heated up to 190° C. with stirring under a pressure of 0.4 MPa (Abs). 101.7 kg (735.4 mol) of metaxylylenediamine (purity 99.99% by mass) was dropwise added while the pressure inside the reactor was kept at 0.4 MPa (Abs), taking 110 minutes. The heating was so controlled that the temperature at the end of the dropwise addition of the diamine could be 240° C., and the steam temperature on the outlet side of the partial condenser was controlled to be 101 to 104° C., and under the condition, the vaporized steam was condensed through the total condenser and discharged out of the system. After the end of the dropwise addition of the diamine, the system was kept at 0.4 MPa (Abs) with stirring for 20 minutes, and then depressurized down to normal pressure at a speed of 0.01 MPa/min, taking 30 minutes, and further depressurized down to 80 kPa (Abs) taking 20 minutes, and kept stirred. After the end of the dropwise addition of the diamine and until the end of depressurization, the reaction liquid temperature was elevated up to 253° C.

After the reaction, the stirring was stopped, and the reactor was pressurized with nitrogen, and the polymer was taken out as strands at 253° C. through the strand die at the bottom of the reactor. The taken-out strands were cooled in water in a water tank, and then pelletized with a pelletizer to give polyamide pellets.

The yellow index (YI) of the resultant pellets was −1, ([COOH]—[NH$_2$]) was 44 µeq/g, the relative viscosity was 2.1, and the melting temperature (Tm) was 190° C.

Example 2

Polyamide pellets were obtained according to the same method as in Example 1, except that sebacic acid (b) was used in place of sebacic acid (a).

The yellow index (YI) of the resultant pellets was 1, ([COOH]—[NH$_2$]) was 47 µeq/g, the relative viscosity was 2.1, and the melting temperature (Tm) was 190° C.

Example 3

Polyamide pellets were obtained according to the same method as in Example 1, except that sebacic acid (d) was used in place of sebacic acid (a).

The yellow index (YI) of the resultant pellets was −1, ([COOH]—[NH$_2$]) was 42 µeq/g, the relative viscosity was 2.1, and the melting temperature (Tm) was 190° C.

Comparative Example 1

Polyamide pellets were obtained according to the same method as in Example 1, except that sebacic acid (c) was used in place of sebacic acid (a).

The yellow index (YI) of the resultant pellets was 6, ([COOH]—[NH$_2$]) was 42 µeq/g, the relative viscosity was 2.1, and the melting temperature (Tm) was 190° C.

Example 4

Using a 500-liter stainless batch reactor equipped with a temperature-controlled oil-running partial condenser, a total condenser, a nitrogen gas introducing duct, a jacket with oil running therethrough to cover around the entire surface of the reactor, a diamine dropping tank, and a pump, a polyamide was synthesized in the manner mentioned below.

150.0 kg (739.8 mol) of sebacic acid (a) and, as a stabilizer, 115 g of sodium hypophosphite were put into the reactor, fully purged with nitrogen, and then the sebacic acid was heated up to 190° C. with stirring under a pressure of 0.4 MPa (Abs). 101.7 kg (735.4 mol) of a mixture of metaxylylenediamine (purity 99.99% by mass) and paraxylylenediamine (purity 99.99% by mass) (metaxylylenediamine/paraxylylenediamine=80/20 by mol) was dropwise added while the pressure inside the reactor was kept at 0.4 MPa (Abs), taking 110 minutes. The heating was so controlled that the temperature at the end of the dropwise addition of the diamine could be 240° C., and the steam temperature on the outlet side of the partial condenser was controlled to be 101 to 104° C., and under the condition, the vaporized steam was condensed through the total condenser and discharged out of the system. After the dropwise addition of the diamine, the system was kept at 0.4 MPa (Abs) with stirring for 20 minutes, and then depressurized down to normal pressure at a speed of 0.01 MPa/min, taking 30 minutes, and further depressurized down to 80 kPa (Abs) taking 20 minutes, and kept stirred. After the end of the dropwise addition of the diamine and until the end of depressurization, the reaction liquid temperature was elevated up to 253° C.

After the reaction, the stirring was stopped, and the reactor was pressurized with nitrogen, and the polymer was taken out as strands at 253° C. through the strand die at the bottom of the reactor. The taken-out strands were cooled in water in a water tank, and then pelletized with a pelletizer to give polyamide pellets.

The yellow index (YI) of the resultant pellets was −1, ([COOH]—[NH$_2$]) was 41 µeq/g, the relative viscosity was 2.1, and the melting temperature (Tm) was 204° C.

Example 5

Polyamide pellets were obtained according to the same method as in Example 4, except that sebacic acid (b) was used in place of sebacic acid (a).

The yellow index (YI) of the resultant pellets was 2, ([COOH]—[NH$_2$]) was 45 µeq/g, the relative viscosity was 2.1, and the melting temperature (Tm) was 204° C.

Example 6

Polyamide pellets were obtained according to the same method as in Example 4, except that sebacic acid (d) was used in place of sebacic acid (a).

The yellow index (YI) of the resultant pellets was 0, ([COOH]—[NH$_2$]) was 43 µeq/g, the relative viscosity was 2.1, and the melting temperature (Tm) was 204° C.

Comparative Example 2

Polyamide pellets were obtained according to the same method as in Example 4, except that sebacic acid (c) was used in place of sebacic acid (a).

The yellow index (YI) of the resultant pellets was 7, ([COOH]—[NH$_2$]) was 41 µeq/g, the relative viscosity was 2.1, and the melting temperature (Tm) was 204° C.

Example 7

Using a 500-liter stainless batch reactor equipped with a temperature-controlled oil-running partial condenser, a total condenser, a nitrogen gas introducing duct, a jacket with oil running therethrough to cover around the entire surface of the reactor, a diamine dropping tank, and a pump, a polyamide was synthesized in the manner mentioned below.

150.0 kg (739.8 mol) of sebacic acid (a) and, as a stabilizer, 37 g of calcium hypophosphite were put into the reactor, fully purged with nitrogen, and then the sebacic acid was heated up to 190° C. with stirring under a pressure of 0.4 MPa (Abs). 101.7 kg (735.4 mol) of paraxylylenediamine (purity 99.99% by mass) was dropwise added while the pressure inside the reactor was kept at 0.4 MPa (Abs), taking 110 minutes. The heating was so controlled that the temperature at the end of the dropwise addition of the diamine could be 290° C., and the steam temperature on the outlet side of the partial condenser was controlled to be 101 to 104° C., and under the condition, the vaporized steam was condensed through the total condenser and discharged out of the system. After the dropwise addition of the diamine, the system was kept at 0.4 MPa (Abs) with stirring for 20 minutes, and then depressurized down to normal pressure at a speed of 0.01 MPa/min, taking 30 minutes, and further depressurized down to 80 kPa (Abs) taking 20 minutes, and kept stirred. After the end of the dropwise addition of the diamine and until the end of depressurization, the reaction liquid temperature was elevated up to 295° C.

After the reaction, the stirring was stopped, and the reactor was pressurized with nitrogen, and the polymer was taken out as strands at 295° C. through the strand die at the bottom of the reactor. The taken-out strands were cooled in water in a water tank, and then pelletized with a pelletizer to give polyamide pellets.

The yellow index (YI) of the resultant pellets was 2, ([COOH]—[NH$_2$]) was 45 µeq/g, the relative viscosity was 2.1, and the melting temperature (Tm) was 284° C.

Example 8

Polyamide pellets were obtained according to the same method as in Example 7, except that sebacic acid (b) was used in place of sebacic acid (a).

The yellow index (YI) of the resultant pellets was 4, ([COOH]—[NH$_2$]) was 40 µeq/g, the relative viscosity was 2.1, and the melting temperature (Tm) was 284° C.

Example 9

Polyamide pellets were obtained according to the same method as in Example 7, except that sebacic acid (d) was used in place of sebacic acid (a).

The yellow index (YI) of the resultant pellets was 2, ([COOH]—[NH$_2$]) was 41 µeq/g, the relative viscosity was 2.1, and the melting temperature (Tm) was 284° C.

Comparative Example 3

Polyamide pellets were obtained according to the same method as in Example 7, except that sebacic acid (c) was used in place of sebacic acid (a).

The yellow index (YI) of the resultant pellets was 11, ([COOH]—[NH$_2$]) was 40 µeq/g, the relative viscosity was 2.1, and the melting temperature (Tm) was 284° C.

Example 10

Polyamide pellets were obtained according to the same method as in Example 8, except that 37 g of calcium hypophosphite as a stabilizer was not incorporated.

The yellow index (YI) of the resultant pellets was 8, ([COOH]—[NH$_2$]) was 43 µeq/g, the relative viscosity was 2.1, and the melting temperature (Tm) was 284° C.

Comparative Example 4

Polyamide pellets were obtained according to the same method as in Example 10, except that sebacic acid (c) was used in place of sebacic acid (b).

The yellow index (YI) of the resultant pellets was 16, ([COOH]—[NH$_2$]) was 41 µeq/g, the relative viscosity was 2.1, and the melting temperature (Tm) was 284° C.

The results of Examples 1 to 10 and Comparative Examples 1 to 4 are shown in the following Tables 1-1 and 1-2.

TABLE 1-1

|  |  | Example 1 | Example 2 | Example 3 | Comparative Example 1 | Example 4 | Example 5 | Example 6 | Comparative Example 2 |
|---|---|---|---|---|---|---|---|---|---|
| Sebacic acid used |  | — | (a) | (b) | (d) | (c) | (a) | (b) | (d) | (c) |
| Total content of compounds represented by general formulae (A) and (B) in sebacic acid | ppm by mass | 21 | 72 | 35 | 154 | 21 | 72 | 35 | 154 |
| Diamine | — | | MXDA | | | | MXDA/PXDA (molar ratio: 80/20) | | |
| Stabilizer | — | | Sodium hypophosphite | | | | Sodium hypophosphite | | |
| [COOH]—[NH$_2$] | µeq/g | 44 | 47 | 42 | 42 | 41 | 45 | 43 | 41 |
| Relative viscosity | — | 2.1 | 2.1 | 2.1 | 2.1 | 2.1 | 2.1 | 2.1 | 2.1 |
| Melting temperature | ° C. | 190 | 190 | 190 | 190 | 204 | 204 | 204 | 204 |
| Yellow index of polyamide pellets | — | −1 | 1 | −1 | 6 | −1 | 2 | 0 | 7 |

TABLE 1-2

|  |  | Example 7 | Example 8 | Example 9 | Comparative Example 3 | Example 10 | Comparative Example 4 |
|---|---|---|---|---|---|---|---|
| Sebacic acid used | — | (a) | (b) | (d) | (c) | (b) | (c) |
| Total content of compounds represented by general formulae (A) and (B) in sebacic acid | ppm by mass | 21 | 72 | 35 | 154 | 72 | 154 |
| Diamine | — | | PXDA | | | PXDA | |
| Stabilizer | — | | Calcium hypophosphite | | | None | |
| [COOH]—[NH$_2$] | µeq/g | 45 | 40 | 41 | 40 | 43 | 41 |
| Relative viscosity | — | 2.1 | 2.1 | 2.1 | 2.1 | 2.1 | 2.1 |
| Melting temperature | ° C. | 284 | 284 | 284 | 284 | 284 | 284 |
| Yellow index of polyamide pellets | — | 2 | 4 | 2 | 11 | 8 | 16 |

Comparative Example 5

Using a 500-liter stainless batch reactor equipped with a temperature-controlled oil-running partial condenser, a total condenser, a nitrogen gas introducing duct, a jacket with oil running therethrough to cover around the entire surface of the reactor, a diamine dropping tank, and a pump, a polyamide was synthesized in the manner mentioned below.

150.0 kg (739.8 mol) of sebacic acid (a) and, as a stabilizer, 22 g of calcium hypophosphite were put into the reactor, fully purged with nitrogen, and then the sebacic acid was heated up to 190° C. with stirring under a pressure of 0.4 MPa (Abs). 85.5 kg (735.4 mol) of hexamethylenediamine (purity 99.9% by mass) was dropwise added while the pressure inside the reactor was kept at 0.4 MPa (Abs), taking 110 minutes. The heating was so controlled that the temperature at the end of the dropwise addition of the diamine could be 245° C., and the steam temperature on the outlet side of the partial condenser was controlled to be 101 to 104° C., and under the condition, the vaporized steam was condensed through the total condenser and discharged out of the system. After the dropwise addition of the diamine, the system was kept at 0.4 MPa (Abs) with stirring for 20 minutes, and then depressurized down to normal pressure at a speed of 0.01 MPa/min, taking 30 minutes, and further depressurized down to 80 kPa (Abs) taking 20 minutes, and kept stirred. After the end of the dropwise addition of the diamine and until the end of depressurization, the reaction liquid temperature was elevated up to 250° C.

After the reaction, the stirring was stopped, and the reactor was pressurized with nitrogen, and the polymer was taken out as strands at 250° C. through the strand die at the bottom of the reactor. The taken-out strands were cooled in water in a water tank, and then pelletized with a pelletizer to give polyamide pellets.

The yellow index (YI) of the resultant pellets was −3, ([COOH]—[NH$_2$]) was 45 µeq/g, the relative viscosity was 2.1, and the melting temperature (Tm) was 222° C.

Comparative Example 6

Polyamide pellets were obtained according to the same method as in Comparative Example 5, except that sebacic acid (b) was used in place of sebacic acid (a).

The yellow index (YI) of the resultant pellets was −3, ([COOH]—[NH$_2$]) was 43 µeq/g, the relative viscosity was 2.1, and the melting temperature (Tm) was 222° C.

Comparative Example 7

Polyamide pellets were obtained according to the same method as in Comparative Example 5, except that sebacic acid (d) was used in place of sebacic acid (a).

The yellow index (YI) of the resultant pellets was −2, ([COOH]—[NH$_2$]) was 40 µeq/g, the relative viscosity was 2.1, and the melting temperature (Tm) was 222° C.

Comparative Example 8

Polyamide pellets were obtained according to the same method as in Comparative Example 5, except that sebacic acid (c) was used in place of sebacic acid (a).

The yellow index (YI) of the resultant pellets was −3, ([COOH]—[NH$_2$]) was 41 µeq/g, the relative viscosity was 2.1, and the melting temperature (Tm) was 222° C.

The results of Comparative Examples 5 to 8 are shown in the following Table 2.

TABLE 2

|  |  | Comparative Example 5 | Comparative Example 6 | Comparative Example 7 | Comparative Example 8 |
|---|---|---|---|---|---|
| Sebacic acid used | — | (a) | (b) | (d) | (c) |
| Total content of compounds represented by general formulae (A) and (B) in sebacic acid | ppm by mass | 21 | 72 | 35 | 154 |
| Diamine | — | Hexamethylenediamine | | | |
| Stabilizer | — | Sodium hypophosphite | | | |
| [COOH]—[NH$_2$] | µeq/g | 45 | 43 | 40 | 41 |
| Relative viscosity | — | 2.1 | 2.1 | 2.1 | 2.1 |
| Melting temperature | ° C. | 222 | 222 | 222 | 222 |
| Yellow index of polyamide pellets | — | −3 | −3 | −2 | −3 |

According to the present invention, by using the specific sebacic acid as a dicarboxylic acid component to produce a polyamide resin, the coloration of the polyamide resin to be obtained can be reduced.

The invention claimed is:

1. A method for producing a polyamide resin, comprising: reacting a dicarboxylic acid component containing sebacic acid in an amount of 50 mol % or more and a diamine component containing xylylenediamine in an amount of 70 mol % or more,
   wherein a total content of compounds represented by the following general formulae (A) and the following general formula (B) in the sebacic acid is 100 ppm by mass or less:

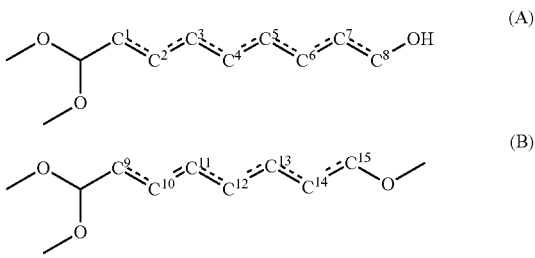

wherein, in the general formula (A), one hydroxyl group is bonded to one of carbon atoms $C^1$, $C^2$, $C^3$, $C^4$, $C^5$, $C^6$, $C^7$ and $C^8$, and one of a bond between $C^1$ and $C^2$, a bond between $C^2$ and $C^3$, a bond between $C^3$ and $C^4$, a bond between $C^4$ and $C^5$, a bond between $C^5$ and $C^6$, a bond between $C^6$ and $C^7$, and a bond between $C^7$ and $C^8$ is a double bond, and the others are single bonds; and in the general formula (B), one hydroxyl group is bonded to one of carbon atoms $C^9$, $C^{10}$, $C^{11}$, $C^{12}$, $C^{13}$, $C^{14}$ and $C^{15}$, and one of a bond between $C^9$ and $C^{10}$, a bond between $C^{10}$ and $C^{11}$, a bond between $C^{11}$ and $C^{12}$, a bond between $C^{12}$ and $C^{13}$, a bond between $C^{13}$ and $C^{14}$, and a bond between $C^{14}$ and $C^{15}$ is a double bond, and the others are single bonds.

2. The method for producing a polyamide resin according to claim 1, wherein the sebacic acid has a purity of 99.5% by mass or more.

3. The method for producing a polyamide resin according to claim 1, wherein the xylylenediamine is metaxylylenediamine, paraxylylenediamine or a mixture thereof.

4. The method for producing a polyamide resin according to claim 1, wherein the dicarboxylic acid component and the diamine component are reacted in the presence of a phosphorus atom-containing compound.

5. The method for producing a polyamide resin according to claim 4, wherein the phosphorus atom-containing compound is selected from the group consisting of sodium hypophosphite, calcium hypophosphite and hydrates of these compounds.

6. The method for producing a polyamide resin according to claim 1, wherein the sebacic acid is obtained according to a recrystallization method using methanol as a solvent.

\* \* \* \* \*